US012418137B2

(12) United States Patent
Ahn et al.

(10) Patent No.: US 12,418,137 B2
(45) Date of Patent: Sep. 16, 2025

(54) DEVICE FOR PROTECTING A CONNECTOR OF A VEHICLE

(71) Applicants: HYUNDAI MOTOR COMPANY, Seoul (KR); KIA CORPORATION, Seoul (KR); YURA CORPORATION CO., LTD., Seongnam-si (KR)

(72) Inventors: Jun Hyung Ahn, Hwaseong-si (KR); Dong Uk Kim, Gwangju-si (KR)

(73) Assignees: HYUNDAI MOTOR COMPANY, Seoul (KR); KIA CORPORATION, Seoul (KR); YURA CORPORATION CO., LTD., Seongnam-si (KR)

( * ) Notice: Subject to any disclaimer, the term of this patent is extended or adjusted under 35 U.S.C. 154(b) by 422 days.

(21) Appl. No.: 17/979,605

(22) Filed: Nov. 2, 2022

(65) Prior Publication Data
US 2023/0170644 A1    Jun. 1, 2023

(30) Foreign Application Priority Data
Nov. 29, 2021   (KR) ........................ 10-2021-0166585

(51) Int. Cl.
*H01R 13/52*    (2006.01)
*H01M 50/172*   (2021.01)

(52) U.S. Cl.
CPC ...... *H01R 13/5205* (2013.01); *H01M 50/172* (2021.01); *H01M 2220/20* (2013.01); *H01R 2201/26* (2013.01)

(58) Field of Classification Search
CPC ............ H01R 13/5205; H01R 2201/26; H01R 13/5221; H01R 13/502; H01R 13/533; H01M 50/172; H01M 2220/20; H01M 50/249; H01M 50/296; B60R 16/02; B60R 16/0222; B60R 16/0239
See application file for complete search history.

(56) References Cited

U.S. PATENT DOCUMENTS

| | | | |
|---|---|---|---|
| 6,660,937 B1 * | 12/2003 | MacLeod | H02G 3/22 174/152 G |
| 9,365,170 B2 * | 6/2016 | Gronowicz, Jr. ... | B60R 16/0222 |
| 11,377,347 B2 * | 7/2022 | Li | B81C 1/00611 |
| 2015/0305174 A1 * | 10/2015 | Yoshimura | B60R 16/0222 174/668 |
| 2021/0122305 A1 * | 4/2021 | Tasaka | H02G 3/0462 |

* cited by examiner

*Primary Examiner* — Briggitte R. Hammond
(74) *Attorney, Agent, or Firm* — Lempia Summerfield Katz LLC

(57) ABSTRACT

A connector protection device for a vehicle is configured to protect an electrical connector to prevent the connector from being chipped or damaged. The device protects the electrical connector by covering the same with a grommet. When the electrical connector is covered with the grommet by stretching a cutout in the grommet to the to match the size and width of the electrical connector, a supporting rib formed on the lower surface of an upper plate of the grommet is pressed upon being brought into contact with a grommet-side connector and, at the same time, the cutout is automatically closed.

6 Claims, 3 Drawing Sheets

DEVICE FOR PROTECTING A CONNECTOR OF A VEHICLE

CROSS-REFERENCE TO RELATED APPLICATION

This application claims under 35 U.S.C. § 119(a) the benefit of priority to Korean Patent Application No. 10-2021-0166585, filed on Nov. 29, 2021, the entire contents of which are incorporated herein by reference.

BACKGROUND

(a) Technical Field

The present disclosure relates to a connector protection device for a vehicle. More particularly, the present disclosure relates to a connector protection device for a vehicle that covers and protects an electrical connector exposed outside of the vehicle.

(b) Background Art

Recently, the number of eco-friendly vehicles such as hybrid vehicles and electric vehicles has increased. One of the greatest areas of interest regarding such vehicles is the management and protection of batteries and related electrical components.

A battery of such an eco-friendly vehicle comprises a plurality of battery modules and is usually mounted to be hidden in the floor of a vehicle body. For electric trucks, the battery is usually mounted in the lower space of a loading box.

In addition, since a cable configured to supply electric power from the battery to a motor and an electric component is provided, an electrical connector for electrical connection of the cable is mounted at a predetermined position on a battery case in which the battery module is installed.

However, since the electrical connector mounted on the battery case is exposed to the external environment, there is a problem in that exposure to various foreign substances may damage the electrical connector.

Specifically, regarding electric trucks, since the battery case is mounted on the lower portion of the loading box, the electrical connector of the battery case is inevitably exposed to the outside. As a result, various foreign substances are thrown up from the road surface during traveling and are introduced into the electrical connector or hit the electrical connector thereby cause chipping of or damage to the electrical connector.

When the electrical connector is damaged, supply of battery power to the motor and various electric components may be interrupted. The vehicle thus may shut down, which may result in an accident.

As a related art to solve the above problems, the electrical connector is covered with a grommet. The grommet is manufactured with a rubber material in the shape of the bell of a trumpet with a cutout formed in the lower portion.

The cutout in the grommet is stretched to match the size and width of the electrical connector so that the electrical connector can be placed inside the grommet. Once covering the electrical connector, the grommet is then released. The stretched cutout is restored to a linear shape by the grommet's own elastic restoring force whereby the electrical connector is covered and protected by the grommet.

However, the conventional grommet has the following problems.

First, a gap is formed around the cutout in the grommet, which covers the electrical connector, due to gravity. The gap allows foreign substances to be introduced into the electrical connector through the gap or to repeatedly hit the electrical connector, thereby causing chipping of or damage to the electrical connector.

Second, the grommet may not maintain its original shape but may be deformed or moved due to foreign substances that repeatedly and directly hit the grommet during traveling of the vehicle, thereby causing chipping of or damage to the electrical connector.

The above information disclosed in this Background section is only to enhance understanding of the background of the disclosure. Therefore, the above information may contain information that does not form the prior art that is already known to a person of ordinary skill in the art.

SUMMARY OF THE DISCLOSURE

The present disclosure has been made in an effort to solve the above-described problems associated with the prior art. An object of the present disclosure is to provide a connector protection device for a vehicle configured to protect an electrical connector from being chipped or damaged. The device may protect the electrical connector by covering the same with a grommet. When covering the electrical connector with the grommet by stretching a cutout in the grommet to match the size and width of the electrical connector, a supporting rib formed on the lower surface of an upper plate of the grommet may be pressed to be brought into contact with a grommet-side connector. At the same time, the cutout may be automatically closed.

In one aspect, the present disclosure provides a connector protection device for a vehicle. The device includes a grommet configured to cover an electrical connector exposed outside of the vehicle. A cutout capable of being opened or closed may be formed in a lower plate of the grommet. A supporting rib, pressed by being brought into contact with a grommet-side connector, may be formed on the lower surface of an upper plate of the grommet.

In an embodiment, when covering the electrical connector with the grommet, the supporting rib of the grommet may be pressed to be brought into contact with an upper surface of the grommet-side connector into which the electrical connector of a battery case is fitted. The cutout formed in the lower plate is thereby allowed to be closed while opposite side plates and the lower plate of the grommet are rotated inwards.

In another embodiment, reinforcing ribs for reinforcement of rigidity and restoration of shape may be integrally formed to protrude from four corners of the inner surface of the grommet.

In still another embodiment, a cover end may be further integrally formed on one side of the cutout formed in the lower plate of the grommet to cover a gap in the cutout.

In yet another embodiment, a hollow guide, through which a cable connected to the grommet-side connector passes, may be formed to protrude from the front portion of the grommet to communicate with the cutout.

In still another embodiment, a guide mark, indicating the mounting direction of the grommet, may protrude from the outer surface of the upper plate of the grommet.

In a further embodiment, a chipping prevention bracket may be mounted at a lower position of a battery case to which the electrical connector is mounted.

Other aspects and embodiments of the disclosure are discussed below.

It should be understood that the terms "vehicle" or "vehicular" or other similar terms as used herein are inclusive of motor vehicles in general. Such motor vehicles may include passenger automobiles including sports utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, such as for example, a vehicle that is powered by both gasoline and electricity.

The above and other features of the disclosure are discussed below.

BRIEF DESCRIPTION OF THE DRAWINGS

The above and other features of the present disclosure are now be described in detail with reference to certain embodiments illustrated in the accompanying drawings, which are given hereinbelow by way of illustration only, and thus are not limitative of the present disclosure, and wherein.

The appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the intended application and use environment.

In the figures, reference numbers refer to the same or equivalent parts of the present disclosure throughout the several figures of the drawings.

DETAILED DESCRIPTION

Hereinafter, embodiments of the present disclosure are described with reference to the accompanying drawings.

Figure 1:
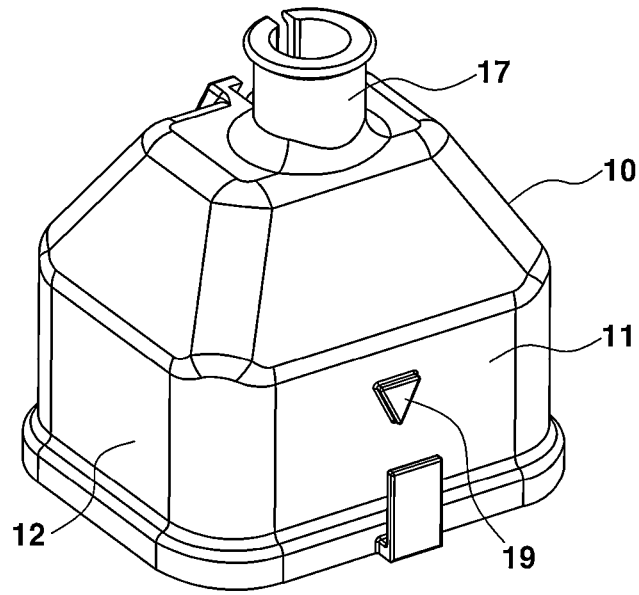
FIGS. 1 and 2 are perspective views illustrating a grommet in a connector protection device for a vehicle according to the present disclosure.
Figure 2:
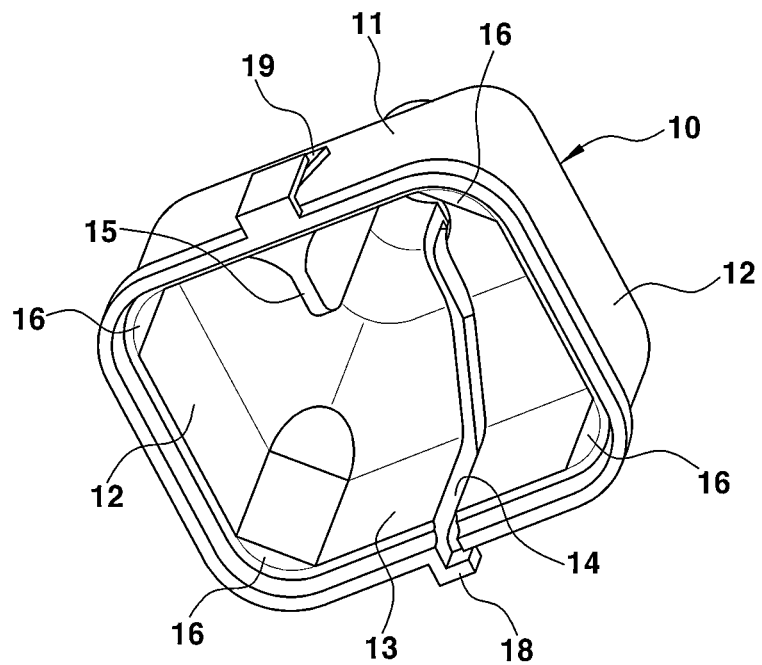
Figure 3:
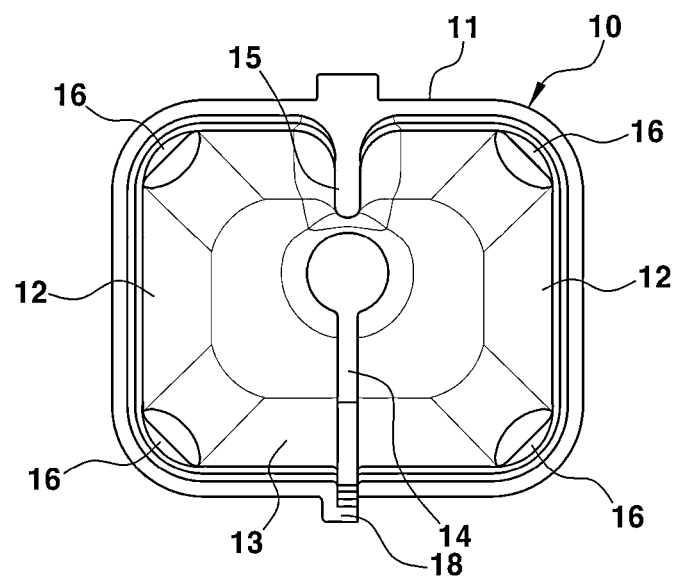
FIG. 3 is a rear view illustrating an internal structure of the grommet in the connector protection device for a vehicle according to the present disclosure.

FIGS. 1 and 2 are perspective views illustrating a grommet in a connector protection device for a vehicle according to the present disclosure. FIG. 3 is a rear view illustrating an internal structure of the grommet in the connector protection device for a vehicle according to the present disclosure.

As illustrated in FIGS. 1-3, a grommet 10 is made of rubber or a flexible material (e.g., ethylene propylene diene monomer (EPDM)). The grommet 10 has a structure in which an upper plate 11, opposite side plates 12, and a lower plate 13 are integrally formed so as to create a predetermined space therein. The lower plate 13 is provided with a cutout 14, which is capable of being opened or closed and is formed in the front and rear (forward and rearward or longitudinal) direction of the grommet.

In particular, a supporting rib 15, which is pressed when brought into contact with connectors 110 and 110-1, is integrally formed on the lower surface of the upper plate 11 of the grommet 10, as illustrated in FIG. 3.

The supporting rib 15 has a vertical bar-shaped cross section and protrudes downwards from a middle portion of the lower surface of the upper plate 11 in the widthwise direction thereof.

Figure 6:
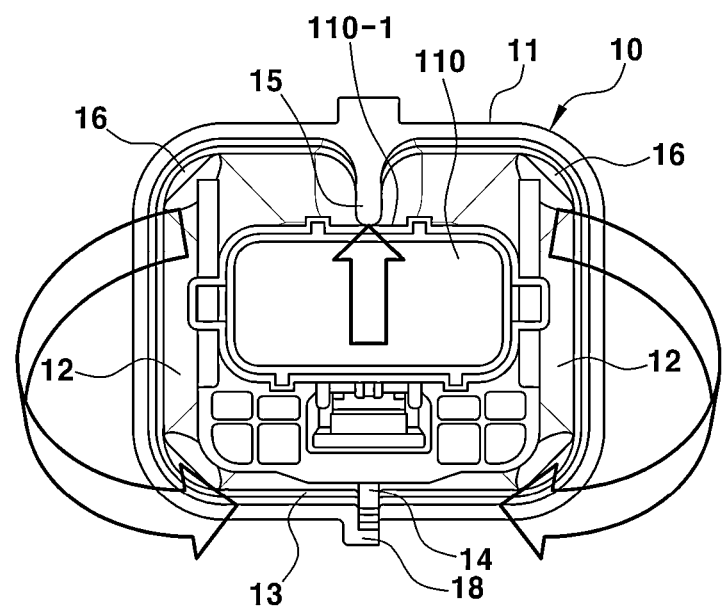
FIG. 6 is a cross-sectional view illustrating a cutout portion closed by a connector-supporting rib when the grommet in the connector protection device for a vehicle according to the present disclosure is installed to cover the electrical connector of the battery case.

With this configuration, when the electrical connector 110 is covered by the grommet 10, the supporting rib 15, which is formed on the upper plate 11 of the grommet 10, is pressed upon being brought into contact with the upper surface of the grommet-side connector 110-1, into which the electrical connector 110 of a battery case 100 is fitted. The cutout 14 formed in the lower plate 13 is thereby closed while rotating the side plates 12 and the lower plate 13 of the grommet 10 inwards, as illustrated in FIG. 6.

In addition, as illustrated in FIG. 3, reinforcing ribs 16, provided to reinforce rigidity and restore the shape of the grommet 10, are integrally formed to protrude from four corners of the inner surface of the grommet 10.

More specifically, since the reinforcing ribs 16, each of which has a chamfered cross-sectional shape, protrude from the four corners of the inner surface of the grommet 10, the grommet 10 can be easily restored to its original shape by the reinforcing ribs 16. This is possible even if the grommet 10 has a gap around the cutout 14. This is also possible even if the grommet 10 is inverted during the process of assembling the grommet 10 to the electrical connector, which is the process of covering the electrical connector with the grommet 10. Thus, the closing force of the cutout 14 is reinforced.

In addition, a cover end 18 is further integrally formed on one side of the cutout 14 formed in the lower plate 13 of the grommet 10 to cover a gap present even in the state in which the cutout 14 is closed.

A cylindrical hollow guide 17 protrudes from the front portion of the grommet 10 to allow a cable 120 to be connected therethrough to the grommet-side connector 110-1 into which the electrical connector 110 of the battery case 100 is fitted. The cutout 14 extends towards the lower portion of the hollow guide 17, whereby the hollow guide 17 and the cutout 14 are in communication with each other.

A guide mark 19 indicates the mounting direction of the grommet 10 and protrudes from the outer surface (upper surface) of the upper plate 11 of the grommet 10. Thus, an operator can easily recognize the orientation and mounting direction of the grommet 10.

A process of assembling the connector protection device of the present disclosure including the grommet with the above-described configuration is described as follows.

Figure 4:
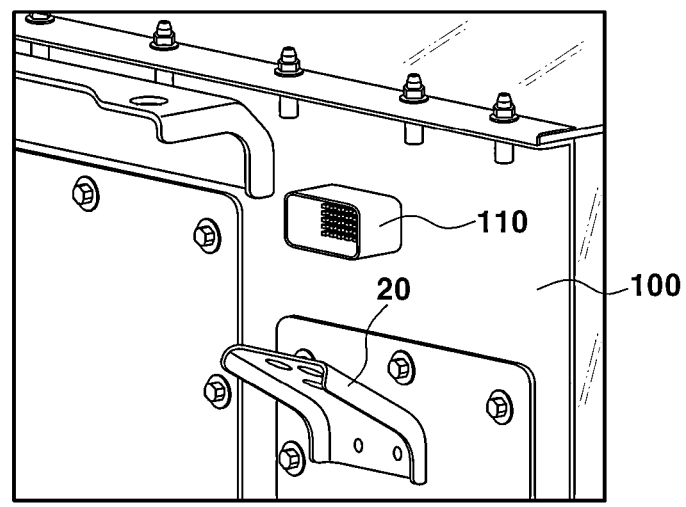
FIG. 4 is a perspective view illustrating the state in which a chipping prevention bracket is mounted on a battery case in the connector protection device for a vehicle according to the present disclosure.
Figure 5:
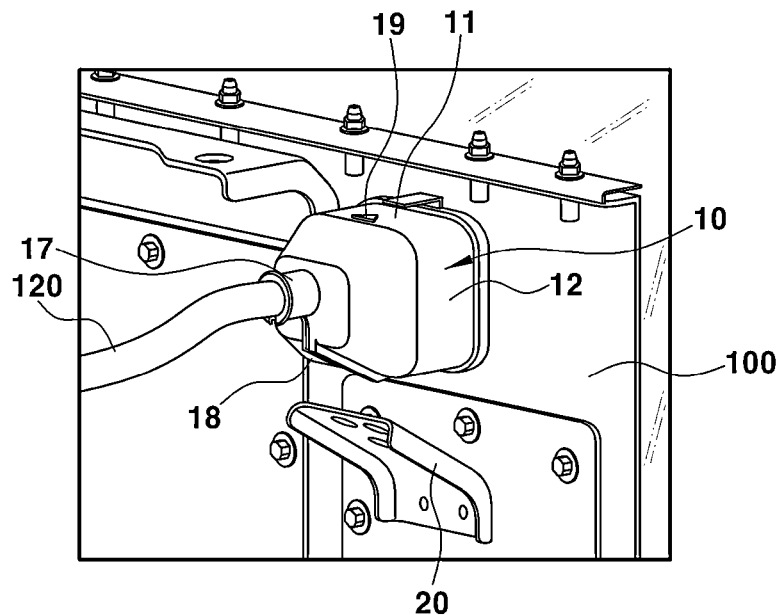
FIG. 5 is a perspective view illustrating the state in which the grommet in the connector protection device for a vehicle according to the present disclosure is mounted to cover an electrical connector of the battery case.

FIG. 4 is a perspective view illustrating the state in which a chipping prevention bracket is mounted on the battery case in the connector protection device according to the present disclosure. FIG. 5 is a perspective view illustrating the state in which the grommet in the connector protection device according to the present disclosure is installed to cover the electrical connector of the battery case.

A battery case of an electric vehicle (in particular, an electric truck), i.e., the battery case 100, is built with a plurality of battery modules therein and is exposed to the outside (i.e., to the exterior environment of the vehicle)

when mounted on the lower portion of a loading box. As illustrated in FIG. 4, the electrical connector 110, which may be for high-voltage cable connection and mounted on the battery case 100, is also exposed to the outside.

Accordingly, various foreign substances may be thrown up from a road surface during vehicle travel. These foreign substance or contaminants may be introduced into the electrical connector 110, and may hit and chip or damage the electrical connector 110.

To solve this problem, a chipping prevention bracket 20 is mounted at a lower position of the battery case 100 to which the electrical connector 110 is mounted.

The chipping prevention bracket 20 is provided as a plate structure in which the inner end portion thereof is mounted on the battery case 100 and is inclined upwards towards the outer end portion thereof. The chipping prevention bracket 20 thereby may more easily block foreign substances that are thrown up from the road surface towards the electrical connector.

Accordingly, large particulate foreign substances that are thrown up from the road surface towards the electrical connector 110 while the vehicle travels may be primarily blocked by the chipping prevention bracket 20.

However, some foreign substances thrown up from the road surface while the vehicle travels may not be blocked by the chipping prevention bracket 20 and instead may be introduced into the electrical connector 110 or hit the same.

To solve this problem, the grommet 10 having the above configuration covers the electrical connector 110 of the battery case 100 as illustrated in FIG. 5.

To this end, the grommet 10 is closely adhered to the outer surface of the battery case 100, on which the electrical connector 110 is also mounted. This allows the electrical connector 110 to enter the grommet 10 through the rear opening in the grommet 10.

The grommet-side connector 110-1 is accommodated inside the grommet 10, as illustrated in FIG. 6. The grommet 10 remains upside down or inverted to expose the grommet-side connector 110-1 to the outside until the grommet-side connector 110-1 is fitted onto the electrical connector 110, which is mounted on the battery case 100. In this state, an operator can easily fit the grommet-side connector 110-1 onto the electrical connector 110 mounted on the battery case 100.

After the grommet-side connector 110-1 is fitted onto the electrical connector 110 mounted on the battery case 100, the grommet 10 is turned over to restore its original shape. Thus, the electrical connector 110 of the battery case 100 and the grommet-side connector 110-1 are completely covered and protected by the grommet 10.

The cable 120 for connection with a motor and various electrical components of the vehicle passes through the hollow guide 17 of the grommet 10 to be connected to the grommet-side connector 110-1.

When the electrical connector 110 of the battery case 100 is covered by the grommet 10, the supporting rib 15 formed on the upper plate 11 of the grommet 10 is pressed when brought into contact with the upper surface of the grommet-side connector 110-1, into which the electrical connector 110 of the battery case 100 is fitted. The cutout 14 formed in the lower plate 13 is thereby permitted to be closed while the side plates 12 and the lower plate 13 of the grommet 10 are rotated inwards, as illustrated in FIG. 6.

In other words, the supporting rib 15 has a vertical bar-shaped cross section and is formed to protrude downwards from the middle portion of the lower surface of the upper plate 11 in the widthwise direction thereof. When the supporting rib 15 is pressed upon being brought into contact with the upper surface of the grommet-side connector 110-1, the supporting rib 15 transmits a rotational force in the inward direction to the opposite side plates 12 and the lower plate 13. The rotational force is the same as the force generated when the supporting rib 15 is pressed. The cutout 14 formed in the lower plate 13 is thereby closed while rotating the side plates 12 and the lower plate 13 of the grommet 10 inwards.

When the electrical connector 110 is covered with the grommet 10, the supporting rib 15 formed on the lower surface of the upper plate 11 of the grommet 10 is pressed upon being brought into contact with the grommet-side connector 110-1. Thus, the side plates 12 and the lower plate 13 of the grommet 10 are rotated inwards so as to allow the cutout 14 formed in the lower plate 13 to be automatically closed. As such, the grommet 10 may completely protect the electrical connector 110 so as to prevent the electrical connector from being chipped or damaged.

In addition, as long as the supporting rib 15 of the grommet 10 maintains contact with the grommet-side connector 110-1, into which the electrical connector 110 of the battery case 100 is fitted, the cutout 14 in the grommet 10 may be kept closed. Creation of a gap is thereby prevented around the cutout 14 due to gravity. Accordingly, chipping or damage caused by foreign substances thrown up from the road surface during travel can be completely prevented.

Here, as described above, the cover end 18 is further formed on one side of the cutout 14, which is formed in the lower plate 13 of the grommet 10, to cover a gap that may be present even in the state in which the cutout 14 is closed. As a result, even small particulate foreign substances may be easily prevented from being introduced into the electrical connector 110 through the cutout 14.

As described above, the reinforcing ribs 16 each may have a chamfered cross-sectional shape and protrude from the four corners of the inner surface of the grommet 10. Thus, the grommet 10 can be restored to its original shape by the reinforcing ribs 16. The grommet 10 also can maintain its original shape without deformation even if the grommet 10 has a gap around the cutout 14 or is inverted during the manufacturing and assembly process of the grommet 10.

As is apparent from the above description, the present disclosure provides the following effects:

First, when covering the electrical connector with the grommet, the supporting rib formed on the lower surface of the upper plate of the grommet is pressed upon being brought into contact with the grommet-side connector, into which the electrical connector of the battery case is fitted. Thus, the side plates and the lower plate of the grommet are rotated inwards and thus the cutout formed in the lower plate can be automatically closed. The grommet is thereby allowed or permitted to completely protect the electrical connector so as to prevent the connector from being chipped or damaged.

Second, as long as the supporting rib of the grommet maintains contact with the grommet-side connector, the cutout in the grommet can be kept closed and creation of a gap around the cutout caused by gravity can be prevented. Thus, chipping or damage caused by foreign substances introduced into or hitting the electrical connector can be prevented.

Third, with the reinforcing ribs each having a chamfered shape and protruding from the four corners of the inner surface of the grommet, the grommet can be restored to its original shape even if the grommet has a gap around the cutout or is inverted during the assembly process. Thus, the closing force of the cutout can be increased.

Fourth, since the reinforcing ribs each of which has a chamfered shape, protrude from the four corners of the inner surface of the grommet, the rigidity of the grommet is increased, and deformation of the grommet is prevented.

Fifth, since the chipping prevention bracket is installed at the lower position of the electrical connector of the battery case, it is possible to primarily block foreign substances from being thrown towards the electrical connector and the grommet.

Although the present disclosure has been described in detail with reference to specific embodiments, the scope of the present disclosure is not limited to the above-described embodiments. Various modifications and improvements by those having ordinary skill in the art using the basic concepts of the present disclosure as defined in the claims below are also included in the scope of the present disclosure.

What is claimed is:

1. A connector protection device for a vehicle, the device comprising:
   a grommet configured to cover an electrical connector, which when installed, is exposed outside of the vehicle,
   wherein a cutout, capable of being opened or closed, is formed in a lower plate of the grommet,
   wherein a supporting rib, pressed when brought into contact with a grommet-side connector, is formed on a lower surface of an upper plate of the grommet, and
   wherein reinforcing ribs configured to reinforce rigidity and restore a shape are integrally formed to protrude from four corners of an inner surface of the grommet.

2. The device of claim 1, wherein the supporting rib of the grommet is configured to be pressed by an upper surface of the grommet-side connector when the electrical connector is inserted therein, such that the cutout formed in the lower plate is configured to be closed by inward rotation of opposite side plates and the lower plate of the grommet.

3. A connector protection device for a vehicle, the device comprising:
   a grommet configured to cover an electrical connector, which when installed, is exposed outside of the vehicle,
   wherein a cutout, capable of being opened or closed, is formed in a lower plate of the grommet,
   wherein a supporting rib, pressed when brought into contact with a grommet-side connector, is formed on a lower surface of an upper plate of the grommet, and
   wherein a cover end is further integrally formed on one side of the cutout formed in the lower plate of the grommet to cover a gap in the cutout.

4. The device of claim 2, wherein a hollow guide is formed to protrude from a front portion of the grommet to communicate with the cutout and through which a cable connected to the grommet-side connector passes.

5. The device of claim 1, wherein a guide mark indicating a mounting direction of the grommet, protrudes from an outer surface of the upper plate of the grommet.

6. The device of claim 1, further comprising:
   a chipping prevention bracket disposed at a lower position of a battery case on which the electrical connector is mounted, the chipping prevention bracket being configured to prevent foreign substances from being thrown up toward the electrical connector.

* * * * *